United States Patent
Rolfe et al.

(10) Patent No.: US 9,952,937 B2
(45) Date of Patent: *Apr. 24, 2018

(54) METHOD AND SYSTEM FOR REDUCING JOURNALING LOG ACTIVITY IN DATABASES

(71) Applicant: OPENET TELECOM LTD., Dublin (IE)

(72) Inventors: David Rolfe, Dublin (IE); Cameron Ross Dunne, Kildare (IE); Alan McNamee, Dublin (IE); Andrew D'Souza, Silver Spring, MD (US)

(73) Assignee: OPENET TELECOM LTD., Dublin (IE)

( * ) Notice: Subject to any disclaimer, the term of this patent is extended or adjusted under 35 U.S.C. 154(b) by 501 days.

This patent is subject to a terminal disclaimer.

(21) Appl. No.: 14/522,990

(22) Filed: Oct. 24, 2014

(65) Prior Publication Data

US 2015/0120668 A1 Apr. 30, 2015

Related U.S. Application Data

(60) Provisional application No. 61/896,236, filed on Oct. 28, 2013.

(51) Int. Cl.
*G06F 17/30* (2006.01)
*G06F 11/14* (2006.01)

(52) U.S. Cl.
CPC ...... *G06F 11/1458* (2013.01); *G06F 11/1471* (2013.01); *G06F 2201/80* (2013.01)

(58) Field of Classification Search
CPC ............ G06F 11/1458; G06F 11/1471; H04M 15/7652
USPC ........................................................ 707/643
See application file for complete search history.

(56) References Cited

U.S. PATENT DOCUMENTS

| 8,943,221 | B2 * | 1/2015 | McNamee et al. ............ 709/238 |
| 2007/0179994 | A1 * | 8/2007 | Deguchi et al. ............... 707/202 |
| 2012/0158993 | A1 * | 6/2012 | McNamee et al. ............ 709/238 |

OTHER PUBLICATIONS

Stamatis Stefanakos, Reliable routings in networks with generalized link failure events, 2008, vol. 6, 1331-1339.*

* cited by examiner

*Primary Examiner* — Jean B Fleurantin
(74) *Attorney, Agent, or Firm* — The Marbury Law Group, PLLC

(57) ABSTRACT

Methods, devices and systems enable restoring a database system more efficiently. A server computing device may be configured to receive a database transaction request that includes information identifying a database operation, determine a priority value for the database operation, and add the database operation to a journaling log based on the determined priority value. After detecting a failure event, the server computing device may perform the database operations identified in the journaling log to restore the database system.

33 Claims, 10 Drawing Sheets

| Database Operation 206 | Database action 208 | User Importance 210 | Network Importance 212 | Criticality 214 |
|---|---|---|---|---|
| 1 Insert – Session starts | Customer has 500 access units (AUs) available for use | High | High | High |
| 2 Update – Session updated | Customer uses 200 AUs (300 AUs remain) | Low | High | Low |
| 3 Update – Session updated | Customer uses 10 AUs (290 AUs remain) | Low | Low | Low |
| 4-20 Update – Session updated | Customer uses 10 AUs (120 AUs remain) | Low | Low | Low |
| 21 Update – Session updated | Customer adds 500 AUs (620 AUs remain) | High | High | Low |
| 22 Update – Session updated | Customer uses 10 AUs (610 AUs remain) | Low | Low | Low |
| 23-122 Update – Session updated | Customer uses 1-10 AUs | Low | Low | Low |
| 123 Delete – Session ends Record deleted | Customer has used all AUs | Low | High | High |

| Database Operation 206 | Database action 208 | User Importance 210 | Network Importance 212 | Criticality 214 |
|---|---|---|---|---|
| 1 | Insert – Session starts | Customer has 500 access units (AUs) available for use | High | High | High |
| 2 | Update – Session updated | Customer uses 200 AUs (300 AUs remain) | Low | High | Low |
| 3 | Update – Session updated | Customer uses 10 AUs (290 AUs remain) | Low | Low | Low |
| 4-20 | Update – Session updated | Customer uses 10 AUs (120 AUs remain) | Low | Low | Low |
| 21 | Update – Session updated | Customer adds 500 AUs (620 AUs remain) | High | High | Low |
| 22 | Update – Session updated | Customer uses 10 AUs (610 AUs remain) | Low | Low | Low |
| 23-122 | Update – Session updated | Customer uses 1-10 AUs | Low | Low | Low |
| 123 | Delete – Session ends Record deleted | Customer has used all AUs | Low | High | High |

FIG. 2

METHOD AND SYSTEM FOR REDUCING JOURNALING LOG ACTIVITY IN DATABASES

RELATED APPLICATIONS

This application claims the benefit of priority to U.S. Provisional Application No. 61/896,236, titled "System and Method for Persistent Storage in Distributed Telecommunications Networks" filed Oct. 28, 2013, the entire contents of which are hereby incorporated by reference.

BACKGROUND

Generally, telecommunication systems include network components (e.g., server computing devices) that implement various features, functions, technologies, or solutions to process, route, and/or otherwise manage the voice, data, and control signals that are sent to and from user equipment devices. As part of these operations, these network components frequently access, use and update telecommunication data stored in one or more database systems. In doing so, the network components and/or database systems are often required to perform a large number of simple yet time-consuming database operations (e.g., insert, read, delete, update, etc.). These database operations may have a direct and significant impact on the performance characteristics of the services, applications, and components of the telecommunication system. As such, improving the performance characteristics of the database systems will improve the performance characteristics of the services, applications, and components in the telecommunication system. This will be beneficial to telecommunication network operators and to the consumers of their services.

SUMMARY

The various embodiments include methods of restoring a database system, which may include receiving in a processor of a server computing device a database transaction request that includes information identifying a database operation, determining a priority value for the database operation, adding the database operation to a journaling log based on the determined priority value, detecting a failure event, and performing database operations identified in the journaling log in response to detecting the failure event. In an embodiment, the method may include determining whether the database operation is a critical operation based on whether failing to perform the database operation would impact a service delivery functionality of a telecommunication system, and adding the database operation to the journaling log in response to determining that the database operation is a critical operation.

In a further embodiment, determining the priority value for the database operation may include determining whether a notable flag associated with the database transaction request is set. In a further embodiment, adding the database operation to the journaling log based on the determined priority value may include adding the database operation to the journaling log in response to determining that the notable flag is set. In a further embodiment, determining the priority value for the database operation may include determining a transaction type of the database operation, and computing the priority value based on the transaction type.

In a further embodiment, determining the transaction type of the database operation may include determining whether the database operation is one of an insert operation, a delete operation, and an update operation. In a further embodiment, computing the priority value based on the transaction type may include assigning a high priority to the database operation in response to determining that the database operation is one of the insert operation and the delete operation. In a further embodiment, computing the priority value based on the transaction type may include determining whether the database operation adds service access units to a balance account in a charging system in response to determining that the database operation is the update operation, and assigning a high priority to the database operation in response to determining that the database operation adds access units to the balance account.

In a further embodiment, adding the database operation to the journaling log based on the determined priority value may include determining whether the priority value is greater than a threshold value, and adding the database operation to the journaling log in response to determining that the determined priority value is greater than the threshold value. In a further embodiment, determining whether the priority value is greater than the threshold value may include determining whether determined priority value is greater than a system load value computed at run time. In a further embodiment, determining the priority value for the database operation may include assigning a high priority to the database operation in response to determining that a number of other database operations were previously assigned a low priority.

In a further embodiment, determining the priority value for the database operation may include determining the priority value based on an aggregate of values associated with database operations that were previously assigned a low priority. In a further embodiment, determining the priority value for the database operation may include determining the priority value based on a probability that failure to perform the database operation will result in a user contacting customer services. In a further embodiment, determining the priority value for the database operation may include determining the priority value based on a roaming status.

Further embodiments may include a server computing device that includes a processor configured with processor-executable instructions to perform operations including receiving a database transaction request that includes information identifying a database operation, determining a priority value for the database operation, adding the database operation to a journaling log based on the determined priority value, detecting a failure event, and performing database operations identified in the journaling log in response to detecting the failure event. In an embodiment, the processor may be configured with processor-executable instructions to perform operations further including determining whether the database operation is a critical operation based on whether failing to perform the database operation would impact a service delivery functionality of a telecommunication system, and adding the database operation to the journaling log in response to determining that the database operation is a critical operation.

In a further embodiment, the processor may be configured with processor-executable instructions to perform operations such that determining the priority value for the database operation includes determining whether a notable flag associated with the database transaction request is set, and adding the database operation to the journaling log based on the determined priority value includes adding the database operation to the journaling log in response to determining that the notable flag is set. In a further embodiment, the processor may be configured with processor-executable instructions to perform operations such that determining the priority value for the database operation includes determining a transaction type of the database operation, and computing the priority value based on the transaction type.

In a further embodiment, the processor may be configured with processor-executable instructions to perform operations such that determining the transaction type of the database operation includes determining whether the database operation is one of an insert operation, a delete operation, and an update operation, and computing the priority value based on the transaction type includes assigning a high priority to the database operation in response to determining that the database operation is one of the insert operation and the delete operation. In a further embodiment, the processor may be configured with processor-executable instructions to perform operations such that computing the priority value based on the transaction type includes determining whether the database operation adds service access units to a balance account in a charging system in response to determining that the database operation is the update operation, and assigning a high priority to the database operation in response to determining that the database operation adds access units to the balance account.

In a further embodiment, the processor may be configured with processor-executable instructions to perform operations such that adding the database operation to the journaling log based on the determined priority value includes determining whether the priority value is greater than a threshold value, and adding the database operation to the journaling log in response to determining that the determined priority value is greater than the threshold value. In a further embodiment, the processor may be configured with processor-executable instructions to perform operations such that determining whether the priority value is greater than the threshold value includes determining whether determined priority value is greater than a system load value computed at run time.

In a further embodiment, the processor may be configured with processor-executable instructions to perform operations such that determining the priority value for the database operation includes assigning a high priority to the database operation in response to determining that a number of other database operations were previously assigned a low priority. In a further embodiment, the processor may be configured with processor-executable instructions to perform operations such that determining the priority value for the database operation includes determining the priority value based on an aggregate of values associated with database operations that were previously assigned a low priority. In a further embodiment, the processor may be configured with processor-executable instructions to perform operations such that determining the priority value for the database operation includes determining the priority value based on a probability that failure to perform the database operation will result in a user contacting customer services. In a further embodiment, the processor may be configured with processor-executable instructions to perform operations such that determining the priority value for the database operation includes determining the priority value based on a roaming status.

Further embodiments may include a non-transitory computer readable storage medium having stored thereon processor-executable software instructions configured to cause a processor to perform operations for restoring a database system, the operations including receiving a database transaction request that includes information identifying a database operation, determining a priority value for the database operation, adding the database operation to a journaling log based on the determined priority value, detecting a failure event, and performing database operations identified in the journaling log in response to detecting the failure event.

In an embodiment, the stored processor-executable software instructions may be configured to cause a processor to perform operations further including determining whether the database operation is a critical operation based on whether failing to perform the database operation would impact a service delivery functionality of a telecommunication system, and adding the database operation to the journaling log in response to determining that the database operation is a critical operation. In a further embodiment, the stored processor-executable software instructions may be configured to cause a processor to perform operations such that determining the priority value for the database operation includes determining whether a notable flag associated with the database transaction request is set, and adding the database operation to the journaling log based on the determined priority value includes adding the database operation to the journaling log in response to determining that the notable flag is set.

In a further embodiment, the stored processor-executable software instructions may be configured to cause a processor to perform operations such that determining the priority value for the database operation includes determining a transaction type of the database operation, and computing the priority value based on the transaction type. In a further embodiment, the stored processor-executable software instructions may be configured to cause a processor to perform operations such that determining the transaction type of the database operation includes determining whether the database operation is one of an insert operation, a delete operation, and an update operation, and computing the priority value based on the transaction type includes assigning a high priority to the database operation in response to determining that the database operation is one of the insert operation and the delete operation.

In a further embodiment, the stored processor-executable software instructions may be configured to cause a processor to perform operations such that computing the priority value based on the transaction type includes determining whether the database operation adds service access units to a balance account in a charging system in response to determining that the database operation is the update operation, and assigning a high priority to the database operation in response to determining that the database operation adds access units to the balance account. In a further embodiment, the stored processor-executable software instructions may be configured to cause a processor to perform operations such that adding the database operation to the journaling log based on the determined priority value includes determining whether the priority value is greater than a threshold value, and adding the database operation to the journaling log in response to determining that the determined priority value is greater than the threshold value.

In a further embodiment, the stored processor-executable software instructions may be configured to cause a processor to perform operations such that determining whether the priority value is greater than the threshold value includes determining whether determined priority is greater than a system load value computed at run time. In a further embodiment, the stored processor-executable software instructions may be configured to cause a processor to perform operations such that determining the priority value for the database operation includes assigning a high priority to the database operation in response to determining that a number of other database operations were previously assigned a low priority. In a further embodiment, the stored processor-executable software instructions may be configured to cause a processor to perform operations such that determining the priority value for the database operation includes determining the priority value based on an aggregate of values associated with database operations that were previously assigned a low priority.

In a further embodiment, the stored processor-executable software instructions may be configured to cause a processor to perform operations such that determining the priority value for the database operation includes determining the priority value based on a probability that failure to perform the database operation will result in a user contacting customer services. In a further embodiment, the stored processor-executable software instructions may be configured to cause a processor to perform operations such that determining the priority value for the database operation includes determining the priority value based on a roaming status.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 2 is an illustration of an example sequence of database transactions that may be detected by an embodiment component and example values that may be computed for various attributes of the database transactions.

DESCRIPTION

Figure 1:
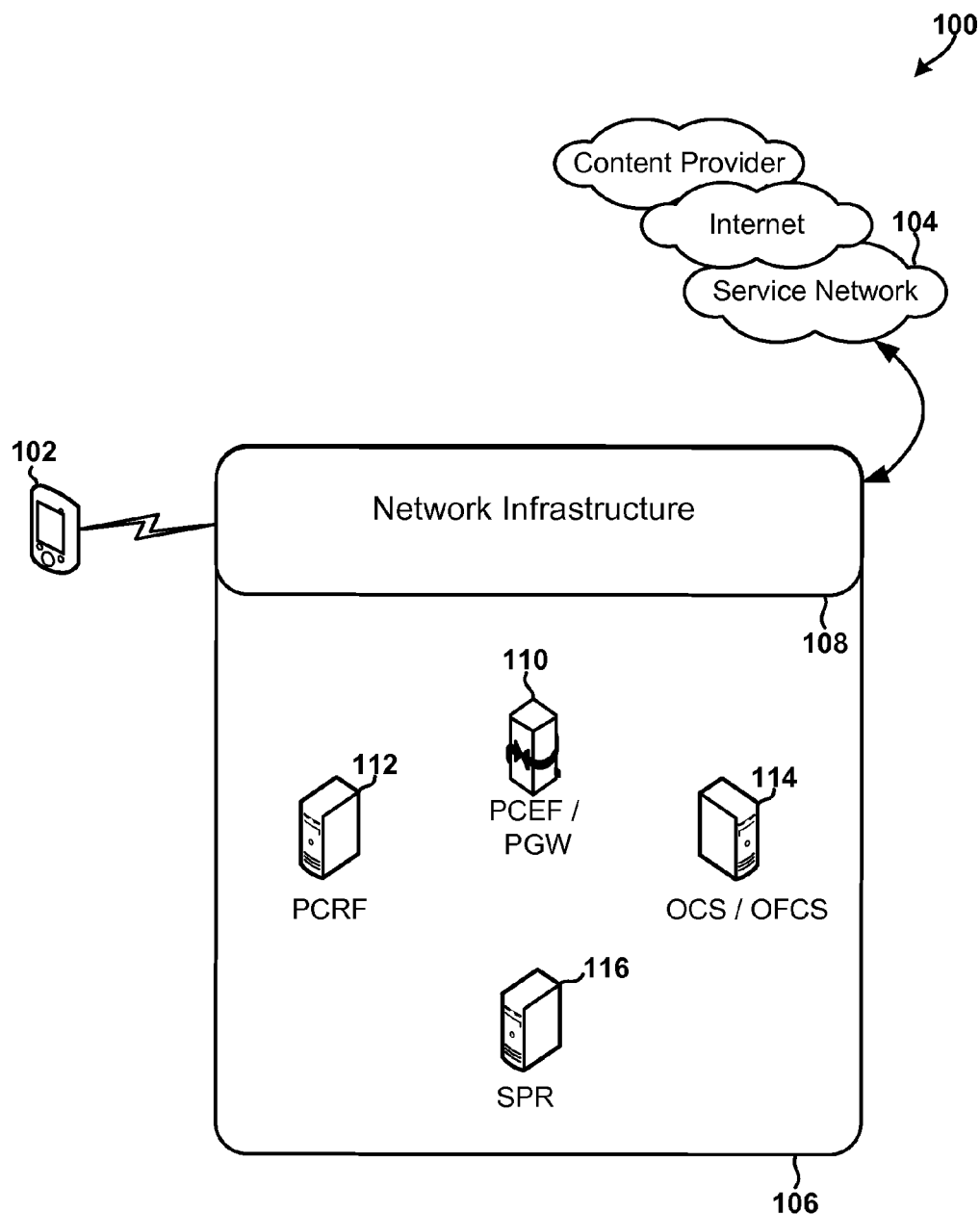
FIG. 1 is a system block diagram illustrating a telecommunication system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

In overview, the various embodiments include methods, and server computing devices configured to implement the methods, of storing database information in a journaling log and using the information in the journaling log to recover or restore a database system after a failure event, such as an unexpected shutdown. A server computing device may be configured to receive a database transaction request that includes information identifying or requiring a database operation, determine a priority value for the database operation, and add only the high priority database operations to the journaling log. The server computing device may perform the database operations included in the journaling log to recover the database in response to detecting a failure event.

The terms "mobile device," "wireless device" "user device," and "user equipment (UE)" may be used interchangeably and refer to any one of various cellular telephones, smart-phones (e.g., iPhone®), personal data assistants (PDA's), palm-top computers, tablet computers, laptop computers, wireless electronic mail receivers (e.g., Blackberry®), VoIP phones, wire-line devices, devices implementing Machine-to-Machine (M2M) technologies, multimedia/Internet enabled cellular telephones, and similar electronic devices capable of sending and receiving wireless communication signals. A wireless device may include a programmable processor and memory. In a preferred embodiment, the wireless device is a cellular handheld device (e.g., a mobile device), which may communicate via a cellular telephone communications network.

A number of different wireline and wireless communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000®), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). References to terminology and/or technical details related to an individual standard or technology are for illustrative purposes only, and are not intended to limit the scope of the claims to a particular communication system or technology unless specifically recited in the claim language.

As used in this application, the terms "component," "module," "node," and the like are intended to include a computer-related entity, such as, but not limited to, hardware, firmware, a combination of hardware and software, software, or software in execution, that is configured to perform particular operations or functions. For example, a component may be, but is not limited to, a process running on a processor, a processor, an object, an executable, a thread of execution, a program, a computing device and/or a computing system.

Generally, improving the accuracy, speed, latency, responsiveness, resilience, and availability characteristics (herein collectively "performance characteristics") of the services, applications, and components of a telecommunication system are important design criteria for network engineers, telecommunication network operators, and designers of telecommunication systems. Yet, such improvements are often limited by the characteristics and operations of the underlying databases and information management solutions (e.g., persistent storage solutions, etc.) that are used by the network components in the telecommunication system. By improving the characteristics and operations of the underlying database system and information management solutions, the various embodiment components improve the functioning, efficiency, and performance characteristics of the services, applications, and components of the telecommunication system.

A database system may include a database management system (DBMS). Examples of database management systems include MySQL, PostgreSQL, Microsoft SQL Server, Oracle, VoltDB, SAP, IBM DB2, and Openet DB. The database system (or DBMS) may be responsible for creating, querying and administrating the database and for inserting, deleting and updating the information stored by the database. The database may also be responsible for ensuring the integrity of the data in the event that there is a failure, such as a system failure or an unexpected shutdown. Said another way, the database system is responsible for ensuring resilience in the event of failure. In this context, a database's "resiliency" refers its ability to recover data and/or return to a previous operating or data state after the occurrence of an event or condition (e.g., an unexpected shutdown, etc.). Improving the resiliency of a database system is an important and challenging design criterion of database engineers.

A database system may include, access, or use different types of memories, including a volatile "main memory" and a non-volatile "disk memory." The memories may include or use any number of different types of memory technologies, including phase change memory (PCM), dynamic random-access memory (DRAM), static random-access memory (SRAM), non-volatile random-access memory (NVRAM), pseudostatic random-access memory (PSRAM), double data rate synchronous dynamic random-access memory (DDR SDRAM), and other random-access memory (RAM) and read-only memory (ROM) technologies known in the art. Each of the different memories types/parts may have different performance characteristics relating to persistence, writing speed (e.g., time required to write data to the memory), latency, access times (e.g., read access time), security, reliability, etc. These characteristics can significantly impact the performance of the database system in terms of its responsiveness, data access times, execution speed, etc.

Most conventional database systems store data in non-volatile disk memory. An in-memory database (IMDB) is a database management system that primarily relies on volatile main memory for the storage of data. Due to the performance characteristics of volatile memories, in-memory databases are typically faster than conventional databases. However, volatile memories require continuous (or near continuous) power in order to store data. As a result, in-memory databases that rely entirely on a volatile main memory for the storage of data are not as resilient as databases that use disk-memory.

A database system may be configured to use any of a variety of well-known fault tolerance, backup, and recovery solutions. Checkpointing is a well-known fault tolerance technique that includes taking a snapshot of the data stored in a database memory at various times (or in response to time triggers), and storing the snapshot for later use (e.g., after a failure, etc.). A database system may use checkpointing to capture and record data stored in disk memory so that it may be used to restore the database to a previous operating state or condition.

An in-memory database system may also use checkpointing (or a similar technique) to store a subset of data in main memory, and a more definitive copy of the data on disk memories. For example, rather than updating the information stored in disk memory every time there is a change, a database system may store the changes in main memory as checkpoints, and periodically (e.g., once a day, etc.) update the disk memory with the checkpoint information. These operations allow the database system to use a combination of volatile and non-volatile memories, and as a result, improve (or better balance) resiliency and performance characteristics of the database.

A "backup" or "checkpoint" may be a file or information structure that stores information suitable for updating the database. By frequently capturing checkpoints and updating the disk memory with checkpoints (via checkpointing operations), the database system may further improve its resiliency characteristics and ensure that the data stored in disk-memory is current or up-to-date. However, to capture and store checkpoints, existing solutions require that the system perform relatively complex and time-consuming operations. Existing solutions also require suspending all database operations/transactions, or generating additional journaling data, while the database is updated with the backup/checkpoint information. As such, capturing too many checkpoints or updating the disk memory too frequently may reduce or negate the performance benefits of using the in-memory database (i.e., the improvements gained by storing a subset of the data in main memory). On the other hand, not capturing checkpoints frequently enough may result in the loss of a significant amount of data (e.g., in the event of a failure). To balance these tradeoffs, a database system may be configured to use a combination of checkpointing and journaling techniques.

Journaling is a well-known technique that includes recording all database operations and/or changes to the tables, indices or other objects stored by the database in a journaling log (e.g., a redo log, undo log, etc.). The journaling log may be stored on disk-memory so that it can survive failures (i.e., so that the data is not erased in the event of a failure). The database system may be configured to use the information included in the journaling log to restore the database to previous operating state or condition. For example, a database system may be configured use the information included in a redo log file to replay or re-perform all the database operations or changes that occurred since the last time the disk memory was updated with checkpoint information. This allows the system to capture checkpoints less frequently without a significant increase in the risk of loss (i.e., without degrading resilience).

Thus, by implementing and using a combination of checkpointing and journaling techniques, a database system may improve its performance and resilience characteristics. Yet, existing journaling and checkpointing solutions were not designed for use in telecommunication systems. As a result, existing solutions do not adequately meet the requirements of high-speed telecommunication systems, do not adequately balance tradeoffs between the performance and resiliency characteristics of the database, implement features that are not useful for the telecommunication system, or perform operations that have a significant negative impact on the performance of the components in the system. For all these reasons, existing database solutions (e.g., existing journaling and checkpointing solutions) do not adequately improve the resiliency or performance characteristics of the services, applications, and components of a telecommunication system.

The various embodiments include components (e.g., database systems on server computing devices, etc.) configured to implement and use improved data management solutions that address the specific needs of a high-speed telecommunication system. The components may be configured to perform intelligent journaling operations that exploit the unique characteristics of telecommunication data and/or which account for the specific features and characteristics of high-speed telecommunication systems. The components may be configured to perform the journaling operations so as to significantly reduce the size and complexity of the journaling logs and/or to eliminate the need to generate backups or checkpoints. For these and other reasons, the components may improve the performance characteristics of the services, applications, and components of a telecommunication system.

Often, information that is generated, stored, accessed or used in a telecommunication system (telecommunication data) is highly volatile and has a short lifetime (e.g., a few minutes, hours, etc.). Due to these characteristics, it is common for the entire contents of a telecommunications database to change several times over the course of a single day. Yet, many of these changes are not significant, important, useful or valuable to the components in the telecommunication network. As such, many of these changes may be discarded or ignored with little or no consequence to the users, telecommunication network operators, or the proper functioning of the services provided by the telecommunication network. Yet, existing database solutions do not intelligently identify, categorize, label, prioritize, or select the database operations (or changes/updates to be information) that should be recorded in a journaling log. Rather, existing solutions require that all database operations be recorded and used as part of the journaling operations. As a result, existing solutions often generate journaling log files that store large amounts of information and/or which require that the system perform a large number of time-consuming operations after a failure event (e.g., to capture, record, or replay all the changes in a checkpoint or journaling log, etc.).

Since much of the telecommunication data is not significant, performing these complex and time database operations to ensure that all the information is properly recovered is an inefficient use of memory, processing, power, and bandwidth resources. These operations may slow or render the database inaccessible for a significant period of time or otherwise have a significant negative impact on the performance characteristics of the applications and services provided by the high-speed telecommunication network.

The various embodiments include components that are configured to intelligently identify, categorize, group, prioritize, label and/or select the database operations (or the updates/changes to the telecommunication data) that are to be added to a journaling log (e.g., redo log, undo log, etc.). By identifying the most important or significant database operations and adding only the most important or significant database operations to the journaling log, the components may reduce the size of the journaling log and the number of operations that are performed when replaying the journaling log. This, in turn, improves the performance characteristics of the telecommunication system.

Further, the speed in which the database transactions are processed and recorded may have a significant impact on the system's performance characteristics. However, due to I/O capacity limits, only a limited number of transactions may be added to a journaling log at given period of time. By reducing the number of transactions added to the journaling logs, the components may improve the speed in which the database transactions are processed and recorded without requiring increases in the system's I/O capacity limit. In addition, these operations may reduce the demands on the telecommunication system's I/O capacity to the point where an expensive storage area network (SAN) is no longer required.

In an embodiment, a component may be configured to monitor database operations, determine the relative importance of the database operations, and generate a journaling log that includes only the most important database operations. In another embodiment, the component may be configured to receive a database transaction request (e.g., a message, call, query, etc.) that identifies a database operation (e.g., an insert operation, a delete operation, an update operation, etc.), determine whether the database operation is significant, add the database operation to the journaling log in response to determining that the database operation is significant, and ignore the database operation (e.g., by excluding the database operation from the journaling log) in response to determining that the database operation is not significant. After a failure event (e.g., an unexpected shutdown, system failure, etc.), the component may perform the database operations in journaling log in response to restore the important information.

In an embodiment, the component may be configured to compute a priority value, and determine whether to add the database operation to the journaling log based on the priority value. The priority value may be a Boolean or binary value that indicates whether the database operation is a significant operation that should be added to the journaling log. The priority value may also be a number or symbol that identifies the relative importance or significance of the database operation.

In an embodiment, the priority value may be a number that may be compared to a threshold value to determine whether the database operation should be added to the journaling log. For example, the priority value of a first transaction/operation may be "50," the priority value of a second transaction/operation may be "150," and the threshold value may be "100," in which case the component may add the second transaction to the journaling log but not the first transaction (or vice versa). In an embodiment, the component may be configured to dynamically vary the threshold value based on the system load (or other contextual information). For example, the component may raise or lower the threshold while the database system is operating based on congestion or how busy the database system is at the time of processing the transactions.

In an embodiment, the component may be configured to determine the priority value based on whether the database operation is a critical operation. The component may determine that the database operation is a critical operation based on whether the failure to perform the database operation would interrupt service delivery, cause the telecommunication system to malfunction, or otherwise have a negative impact on the proper functioning of the telecommunication system. The component may be configured to assign high priority values to database operations that are critical operations so as to ensure that these operations will be added to the journaling log and performed after a failure event (e.g., an unexpected shutdown, system failure, etc.).

In an embodiment, the component may be configured to determine the priority value for the database operation/transaction based on its transaction type (e.g., insert, delete, update, etc.). For example, the component may assign high priority values to all "insert" and "delete" operations to ensure that they are included in the journaling log and performed after a failure event.

In an embodiment, the component may be configured to determine the priority value based on transaction information. For example, to reduce the size of the journaling log, the component may assign low priority values to "update" transactions that deduct a small or relatively insignificant amount of access units from a customer's account balance. On the other hand, the component may assign a high priority value to update transactions that add funds, credits, access units, or service unit allowances (herein collectively "access units") to a customer's account balance to ensure that, in the event of a failure, customer deposits are still honored. The component may also assign a high priority value to update transactions that deduct a large or significant amount of access units from the customer's account balance to help ensure that a failure will not cause the telecommunication network operator to lose a significant amount of revenue.

In an embodiment, the component may be configured to determine the priority value based on contextual information. The component may be configured to request and receive the contextual information from a subscriber manager (e.g., an SPR), a charging system (e.g., an OCS or OFCS), an analytics system, or any other network component in the telecommunication system. The component may also be configured to collect or generate the contextual information on the device.

In an embodiment, the component may be configured to determine the priority value based on contextual information that identifies one or more conditions, events, or circumstances. Examples of such conditions include a balance threshold being reached, a certain number of prior transactions being assigned a low priority, the aggregate value of low priority transactions exceeding a threshold value (e.g., when the cumulative summation of transactions exceeds 100 access units). The component may be configured to use any or all such information to determine the priority value for a database operation/transaction. For example, the component may be configured to assign a high priority value to an update operation that would otherwise be assigned a low priority value (e.g., a transaction that deducts a small amount of access unit from the customer's account balance) in response to determining that the preceding ninety-nine update operations were assigned a low priority. That is, the component may assign a high priority to every hundredth update transaction to ensure that at least some of these transactions are recorded in the journaling log.

In an embodiment, the component may be configured to determine the priority value based on subscriber information, such as the user's subscription status or level (e.g., gold, silver, bronze, etc.). For example, the component may determine that a gold subscriber's transaction is too valuable to lose and/or that it is acceptable to lose transactions associated with bronze subscribers. As such, the component may assign a higher priority to operations associated with a gold subscriber than similar operations that are associated with a bronze subscriber.

In an embodiment, the component may be configured to determine the priority value based on the probability that a user will contact customer services (and hence causing the network operator to have increased costs) or complain on social media (and hence creating bad publicity for the network operator). For example, the component may use the contextual information to determine whether a customer has a history of contacting customer services, has recently contacted customer support, actively monitors the account balance, etc. The component may then use this information to compute a probability value that indicates the likelihood that the user will engage in actions that are likely to generate additional costs for the telecommunication network (e.g., contact customer service, complain, etc.).

In an embodiment, the component may be configured to determine the priority value based on the customer's roaming status. For example, if a user is roaming on a foreign network, then the home network operator may have to pay the foreign network operator for providing services to the roaming user. These services may be of low value when the user is on the home network, but they may be significantly more expensive on the foreign network. If the transactions/operations associated with roaming on the foreign network are not recorded in the journaling log, they may be lost in the event of failure. This may cause the home network operator to lose a significant amount of revenue since it will not be able to charge the user for the services used on the foreign network (due to the transaction being lost) but will still be required to pay the foreign network operator for the use of those services. As such, the component may be configured to assign a high priority value to a transaction that would otherwise be assigned a low priority value (i.e., an update transaction that consumes 10 access units) in response to determining that the customer is currently roaming (i.e., based on the customer's roaming status).

In an embodiment, the component may be configured to evaluate many database operations/transactions to identify a pattern of database interaction. For example, the component may be configured to analyze the relationships between all the database operations stored in main-memory and the operations previously added to the journaling log to identify patterns or trends. The component may also be configured to receive pattern, trend, or analysis information from other components in the network (e.g., an analytics system, etc.).

In an embodiment, the component may be configured to use pattern, trend and/or analysis information to determine the priority values. For example, if operations/transactions associated with a particular mobile device or account are determine the have a significantly higher probability of not being considered significant relative to operations/transactions associated with similar mobile devices or accounts, then there may an increased probability that the mobile device is behaving erroneously (which is particularly relevant in the context of machine-to-machine (M2M) type communications where the mobile devices may act autonomously from any humans). As another example, if transactions associated with mobile devices in a particular cell are determined to have a significantly higher probability of not being considered significant/notable compared to transactions associated with the same mobile devices when they are in other cells, then there may be an increased probability that the radio access network (RAN) in that cell is behaving erroneously. The component may be configured to identify any or all such patterns or trends, and set the priority values of the database operations accordingly.

In an embodiment, the component may be configured to insert additional information about old database operations to the journaling log when they reach a certain age (i.e., a period of time after they were last added to the journaling log). This seems counter-intuitive because it may increase the size of the journaling log, but in practice, it allows the component to start with an empty database and replay all of the operations in the journaling log from any point equal to or older than the selected age. This, in turn, allows the component to recover all the relevant information without generating or using backups or checkpoints. As such, in an embodiment, the component may be configured to forgo performing backup or checkpointing operations and rely entirely on the journaling log for recovery. The component may be configured to perform these recovery operations in lieu of, independent of, or in conjunction with, the operations for selectively adding information to the journaling log.

As discussed above, capturing too many checkpoints or updating the disk memory too frequently may negate the performance benefits of using the in-memory database, and not capturing checkpoints frequently enough may result in the loss of a significant amount of data. To balance performance and resilience characteristics of the database, many conventional recovery solutions generate a checkpoint once a day. After a failure, these solutions update the database with the checkpoint information and use the information in the journaling log to sequentially re-perform all of the operations that occurred since the checkpoint was captured. In this example, since checkpoints are captured once a day, replaying the journaling log may require re-performing up to 24 hours worth of database operations. However, due to the characteristics of telecommunication data (e.g., session information, etc.) these operations are often an inefficient use of computing and database resources.

For example, session information is very volatile, and typically updated multiple times within its relatively short lifetime. Further, session information is only important or significant while the session is active. Therefore, after a session finishes, most of the database updates for that session become insignificant. In addition, it is common for 90% of the session start and finish operations (e.g., insert and delete operation) to occur within thirty minutes of one another, a further 5% of the session start and finish operations to occur within one hour of one another, and for only 5% of the session start and finish operations to occur more than 1 hour apart. Thus, in a common scenario, 95% of sessions start and finish operations may occur within one hour. Further, for the sessions that last more than an hour, there may be time periods greater than an hour in which there are no updates to the session information. Due to these characteristics, replaying 24 hours worth of operations (as described in the example above) to recover session information could result in 23.5 hours of operations that recover information related to sessions that have already terminated. Since much of this information is of little or no use to a telecommunication system, these operations are an inefficient use of resources.

To overcome these inefficiencies, the component may be configured to compute or determine a recovery time interval (e.g., 60 minutes, etc.) for applying the journal log changes to an empty database. The component may then add the database operations/transactions that are stored in main-memory to the journaling log at least once in each recovery time interval. For example, the component may ensure that all of the database operations are updated (and hence added to the journaling log) within one hour of the time when they were last updated (and hence last added to the journaling log). After a failure event, the component may replay the journaling log to redo or re-perform all the important operations that occurred during the most recent recovery time interval (e.g., in the last 60 minutes).

For the above example, because 95% of all sessions start and finish within one hour, the component may set the recovery time interval to be equal to one hour so that 95% of the session information will be added to the journaling log under normal operations. The component may add or intentionally flush the remaining 5% of sessions (i.e., session that last longer than an hour) to the journaling log within one hour of the time when they were last added to the journaling log. This allows the component to completely recover the database by loading an empty database and applying the last hour's worth of changes from the journaling log. Performing these operations eliminates the need for generating a backup or checkpoint, and thus eliminates the need to suspend database transactions during the backup or checkpointing operations. Performing these operations also reduces the amount of time required to apply the journal file changes to the database, thereby improving the performance characteristics of the database system.

In an embodiment, the component may be configured to compute the recovery time interval so that 90% of sessions start and finish within the recovery time interval. In an embodiment, the component may be configured to determine the recovery time interval so to strike a balance between being as small, short, or brief as possible and allowing a large number of sessions to start and finish. For example, the component may determine whether the session completion times form a normal distribution, and in response, set the value of the recovery time interval to be equal to the mean session completion time plus one standard deviation (ensuring that 68% of sessions complete), the mean session completion time plus two standard deviations (ensuring that 95% of sessions complete), or the mean session completion time plus three standard deviations (ensuring that approximately 98% of sessions complete).

In an embodiment, the component may be configured to periodically review all active database records stored in volatile main-memory to identify a database operation or record (e.g., session information, charging information, balance information, etc.) that has not been updated within the most recent recovery time interval (e.g., in the last 60 minutes, etc.), and add/flush the identified database operation/record to a journaling log. In an embodiment, the component may be configured to flush the database records to the journaling log during inactive system periods (e.g., when the component is not busy processing a large number of other database transactions/operations). The component may update the identified database record to include information identifying the time at which the database record was flushed to the journaling log. The component may restore the database by restoring the empty database tables, and performing the database operations in the journaling log that occurred within the most recent time interval.

In an embodiment, the component may be configured to determine a priority value for the database operation, and apply the database operation to empty database tables based on the determined priority value. In an embodiment, the component may be configured to use a threshold value to determine the redo log operations/transactions that are to be performed (or loaded/written back into the empty database tables) based on the urgency of the recovery, the recovery time interval, and/or the system load. For example, the system may set the threshold value to "0" during periods of inactivity and 100 during periods of high activity. If the priority value of a first operation is "50," the priority value of a second operation is "150," and the threshold value is "0," the component could perform both the first and second operations during recovery. On the other hand, if the threshold value is "100," the component would perform the second operation, but not the first.

In various embodiments, the component may be, or may be associated with, an in-memory database system, a relational database system, a server computing device, a database server, a database of a charging system database, a database of a subscriber profile management system, a database of a policy management system, etc. While the various embodiments are particularly useful in a telecommunication signaling network, such as a 3GPP policy charging control network, they may be implemented or used in any system that stores information characterized by high volatility and short lifetimes or which would benefit from a reduction in the size of the journaling log (e.g., a system in which the volume of redo per day can be a multiple of the size of the database itself, etc.).

As an example, consider an application that tracks passengers' sessions as they depart through an airport. Many passengers will depart from an airport in a single day, but each passenger typically spends less than three hours in the airport. Furthermore, each day typically begins and ends with no departing passengers in the airport. A passenger's session begins when he/she checks in at the airport, and ends when he/she is onboard the aircraft and it has departed. Each of these events is normally critical from a security point-of-view. For example, passengers are not permitted to check luggage onto a flight which they do not board in case the luggage contains a bomb. During the passengers' sessions there may have been many updates, but some will be more important than others. For example, a boarding card scan by a government border control agent is more important than an update to the passenger's meal preferences.

As another example, the embodiment components may be implemented or used in a customer care system, such as to support calls and live chat sessions by tracking wait times in the call queue (i.e., before the customer is connected to a representative) or in a database system used to track when a technician arrives to and departs from a customer location. The embodiment components may also be implemented or used in an audience measurement system that tracks content viewing/consumption sessions (which typically last less than 4 hours).

The embodiment component may be implemented or used as part of a data collection solution, such as for Wi-Fi tracking in a department store, airport, mall, stadium, etc. For example, such a system could start a transaction (e.g., via an insert operation) when customer enters a store and connects to in-store access point, keep track of the customer's progress through the store (e.g., various departments visited), and end the "session" when the customer leaves (e.g., via a delete operation).

The embodiment component may be implemented or used as part of a transportation solution, such as a system for tracking flights, trains, trucks, etc. For example, such a system could start a transaction when a truck departs for its destination, collect operational data (route, speed, scheduled and unscheduled stops, delays, vehicle performance metrics, etc.) during the trip, and stop the transaction when the truck arrives at its destination.

The embodiment component may be implemented or used as part of a persistent storage solution for the storage of data where the half-life of the data is only a few seconds.

The various embodiments may be implemented within a variety of communication systems, an example of which is illustrated in FIG. 1. A typical communication system 100 includes user equipment 102 configured to send and receive voice, data, and control signals to and from a service network 104 (and ultimately the Internet and/or a content provider) via a communications network 106. In the example illustrated in FIG. 1, the communications network 106 includes a network infrastructure 108 unit that encapsulates various network components/systems implementing any of a variety of communication technologies/protocols to process and route the voice, data and control signals to and from the user equipment 102. The network infrastructure 108 unit may include, for example, components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 may also include connections to a policy and charging enforcement function (PCEF) 110 component that is connected to a policy and charging rules function (PCRF) 112 component, online/offline charging systems (OCS/OFCS) 114, a subscriber profile repository (SPR) 116, and other similar components that participate in, collect information from, or otherwise contribute to, communications between the service network 104 and the user equipment 102. The components 110-116 in the communication network 106 may communicate using a standardized protocol, such as the Diameter protocol, remote authentication dial in user service (RADIUS) protocol, session initiation protocol (SIP), or any other protocol.

The PCEF 110 component may be responsible for enforcing policy rules to control the bandwidth, the quality of service (QoS), and other characteristics of the services provided to the user equipment 102 devices based on their subscription plans and available balances. The enforcement of policies may also include querying, coordinating, removing, revoking and/or adjusting various resources (e.g., network resources, subscriber resources, etc.) based on the policy rules. The PCEF 110 may also be configured to send signaling information (e.g., control plane information relating to communication setup, security, authentication, charging, enforcement of policy rules, etc.) to the PCRF 112, OCS/OFCS 114, and other similar components.

For example, the PCEF 110 may include a metering and gating component (not illustrated separately in FIG. 1) that is configured to meter the usage of services and resources by the user equipment 102 devices, and generate detailed charging records (e.g., Charge Detail Records or "CDRs") that identify the services and resources consumed by the end users, and communicate with a balance management component (e.g., the OCS/OFCS 114) to ensure proper billing and/or to identify the policies that are to be enforced. The metering and gating component may be configured to determine the services requested by user equipment 102 (or the end user, subscriber, etc.), communicate with the OCS/OFCS 114 component to determine whether the end user has sufficient funds, credits, access units, and/or service unit allowances (herein collectively "access units") to receive the requested services, and control the characteristics of services provided to that end user based on the determined availability of funds, credits, access units, or service units allowance. The metering and gating component may grant or deny the user access to services, throttle the user's bandwidth, send the user notification messages, and/or perform other similar operations based on an account balance or the availability of funds, credits, access units, or service units allowance in that user's balance account.

The SPR 122 component may store subscriber profile information (e.g., customer IDs, preferences, subscription levels, etc.) in one or more data stores. The PCRF 112 component may be responsible for identifying the appropriate policy and charging rules for a given communication session of a given subscriber or terminal device, and sending the identified policy rules to the PCEF 110 for enforcement. Specifically, the PCRF 112 component may be responsible for generating, compiling, and selecting a set of business and technology rules that define the policies that are to be enforced for particular call sessions. The PCRF 112 component may make rule decisions on a per-subscriber, per-session and/or per-service basis. For example, the PCRF 112 component may use subscriber information (e.g., subscriber's city of residence), the current usage parameters (e.g., day of week, time of day, peak hours, etc.), the subscriber's service level (e.g., Gold, Bronze, etc.), and other information related to the subscriber, session, or service to generate and/or select one or more rules or a rule group. The selected rules or rule group may be communicated to the PCEF 110 component as a profile that defines the policies to be enforced.

Each of the components 110-116 in the communication network 106 may include, or may be associated with, one or more database systems that store telecommunication data, such as information that is relevant to a service, application, session or subscriber. For example, the SPR 116 component may include a database system that stores subscriber profile information (e.g., customer IDs, preferences, subscription levels, etc.) in one or more data stores. The PCRF 112 component may include a database system that stores default policy rules, generated rules, session information, etc. The OCS/OFCS 114 may include a database system that stores charging information. These database systems may be hosted "in the cloud" as part of a cloud computing implementation, implemented as an in-memory database of an associated component 110-116, implemented in a stand-alone server computing device, etc.

FIG. 2 illustrates an example sequence of database transactions 1-123 that may be detected by an embodiment component, and example values that may be computed for a database operation 206 attribute, database action 208 attribute, a user importance 210 attribute, a network importance 212 attribute, and a criticality 214 attribute of a database transaction. In an embodiment, the component may also compute values for a last update time attribute (not illustrated), a priority attribute (not illustrated), and/or a notable flag attribute (not illustrated). An embodiment component may be configured to use the values of these attributes 206-214 to intelligently determine whether to include a database operation in a redo log file.

The last update time attribute may store a value identifying the last time the record/transaction was updated, and hence written to the journaling log (e.g., redo log). The database operation 206 attribute may store a value suitable for identifying a database operation (e.g., insert, update, delete, etc.). The database action 208 attribute may store information suitable for identifying a database action or event, such as "customer used two service units," "customer added 500 service units," etc. The user importance 210 attribute may store a value that identifies whether, or probability or likelihood that, the failure to perform database operation will be important to the user (i.e., will degrade the user-experience, cause consumer dissatisfaction, etc.). Similarly, the network importance 212 attribute may store a value that identifies whether, or probability that, the failure to perform a database operation in a redo log will be important to the telecommunication network (i.e., will cause a significant loss in revenue, will increase calls to the customer service department, etc.). The criticality 214 attribute may store a value that identifies whether, or probability that, the database operation will be important for the proper functioning of the telecommunication system. Example values of for the user importance 210, network importance 212, and criticality 214 attributes include "1," "0," "Yes," "No," "High," "Medium," "Low," "90%," "5%," "0.05," and the like.

In the example illustrated in FIG. 2, there are 123 database transactions. Each of these database transactions 1-123 includes a database operation that may be performed to access or update information stored by a database system. In the illustrated example, the database system is a charging database system that stores the consumer's account balance, and the consumer's initial account balance is 500 access units.

The value of the database operation 206 attribute of database transaction 1 indicates that transaction 1 is an "insert" operation that starts a new data session. An embodiment component may be configured to use this information to determine whether database transaction 1 (or its associated database operation) is a critical operation that must be recorded in the redo log in order for the telecommunication system to function properly. For example, the component may determine that the failure to perform the insert operation will result in the data session not being started or initialized properly. In response, the component may determine that the insert operation is a critical operation, and set the value of the criticality 214 attribute of database transaction 1 to "High." The component may also be configured to set the value of the user importance 210 attribute of database transaction 1 to "High" in response to determining that there is a high probability that the failure to properly perform the insert operation will degrade the user experience, cause the user to complain (e.g., to the network provider, online, etc.), or otherwise result in consumer dissatisfaction. Similarly, the component may set the value of the network importance 212 attribute to "High" in response to determining that there is a high probability that the failure to perform the insert operation will cause the network to lose a significant amount of revenue (due to the customer's inability to use the requested service, the consumer using alternative service, etc.).

The same or different component may use the values of the criticality 214, network importance 212, and user importance 210 attributes to determine whether database transaction 1 should be added to the journaling log (i.e., to a redo log file). For example, the component may use the values of criticality 214, network importance 212, and/or user importance 210 attributes to compute a priority value for database transaction 1 (or its database operation), and then use the priority value to determine whether to record the operation to the redo log.

Database transaction 2 is an update operation that deducts 200 access units from consumer's account balance. The component may determine that there is a low probability that the failure to perform the update operation will cause the telecommunication system to malfunction, and in response, set the value of the criticality 214 attribute of database transaction 2 to "Low." The component may also determine that, since the update operation deducts a large number of access units from the consumer's account balance, the failure to perform this operation will not have a negative impact on the customer but may cause the network to lose a significant amount of revenue. As such, the component set the value of the network importance 212 attribute of database transaction 2 to "High," and the value of the user importance 210 attribute of database transaction 2 to "Low."

Database transaction 3 is an update operation that deducts 10 access units from the consumer's account balance. Similarly, each of database transactions 4-20 includes an update operation that deducts 10 access units from consumer's account balance. Since each of database transactions 3 through 20 deducts a relatively small number of access units from the consumer's account balance, the component may determine that the failure to perform database transactions 3-20 will not cause the telecommunication system to malfunction, is not likely to result in user dissatisfaction, and will not result in a significant loss in revenue for the network. As such, the component may set the values of the criticality 214, network importance 212, and user importance 210 attributes of each of database transactions 3 through 20 to "Low."

Database transaction 21 is an update operation adds 500 access units to consumer's account. The embodiment component may determine that the failure to perform the update operation will not cause the telecommunication system to malfunction, and in response, set the value of the criticality 214 attribute to "Low." The component may also determine that, since the update adds access units to the consumer's account balance, there is a high probability the failure to perform the update operation will cause the user to complain and there is a high probability that the network will be required to perform expensive customer service or troubleshooting operations. In response, the component may set the values of the user importance 210 and network importance 212 attributes to "High."

Database transaction 22 is an update operation that deducts 10 access units from consumer's account. Similarly, each of database transactions 23-122 is an update operation that deducts between 1 and 10 access units from consumer's account. Since each of database transactions 23 through 122 deduct a small number of access units from the consumer's account balance, the component may determine that the failure to perform database transactions 23-122 will not cause the telecommunication system to malfunction, is not likely to result in user dissatisfaction, and will not result in a significant loss in revenue for the network. As such, the component may set the values of the criticality 214, network importance 212, and user importance 210 attributes of each of database transactions 23 through 122 to "Low."

Database transaction 123 ends the data session. The component may determine that the failure to perform database transaction 123 may cause the system to malfunction and may result in a resource leak in the telecommunication network. As such, the component may set the values of criticality 214 and network importance 212 attributes of database transactions 123 to "high." The component may set the value of the user importance 210 attribute to "low" in response to determining that the failure to perform database transaction 123 will not have significant impact on the consumer.

Thus, of the 123 database transactions illustrated in FIG. 2, database transactions 1 and 123 are critical operations that must be recorded for the system to function properly, database transaction 2 must be recorded to ensure the network does not lose a significant amount of revenue, and database transaction 21 must be recorded to ensure a pleasant user experience (and prevent complaints or customer service calls). On the other hand, the failure to perform or record the other 119 databases transactions (i.e., database transactions 3-20 and 22-122) in a redo log will not cause the network to malfunction, will not degrade the user experience or cause consumer dissatisfaction, and will not cause the network to lose a significant amount of revenue.

That is, database transactions 3-20 and 22-122 are not significant, valuable, or important to the user, the network operator, or to the proper functioning of the network. Therefore, adding these transactions to the redo log and/or replaying these database transactions (e.g., as part of the redo operations) is an inefficient use of memory, processing, power and bandwidth resources, and may have a negative impact on the system's performance characteristics. By intelligently selecting the database transactions/operations that are added to the redo log (i.e., database transaction 1, 2, 21, and 123), the component may generate a leaner and more targeted redo log that reduces the number of resources that are required or used to perform journaling operations.

Further, the speed in which the database transactions 1-123 are processed and recorded has a significant impact on the system's performance characteristics. However, due to input/output (I/O) capacity limits, only a limited number of transactions may be added to a redo log over a given period of time. By reducing the number of database transactions that are recorded in the redo log, the component allows the system to benefit from journaling operations without incurring the additional cost associated increasing the system's I/O capacity.

In an embodiment, the component may be configured to evaluate the database transactions 1-123 to identify a pattern of database interaction. For example, the component may evaluate database transactions 1-123 to determine that the database transactions include a critical transaction at the start of a session (e.g., database transaction 1), a multitude of intermediate transactions that are relatively insignificant (e.g., database transactions 2-122), and another critical transaction at the end of the session (e.g., database transaction 123). The component may use this information (i.e., the identified pattern of database interaction) to prioritize the database transactions 1-123. For example, the component may assign a higher priority to the first and last transactions (i.e., database transactions 1 and 123) and a lower priority to the intermediate transactions (i.e., database transactions 2-122).

In an embodiment, the component may be configured to further prioritize the intermediate transactions (i.e., database transactions 2-122) based on their relative significance/importance. For example, database transactions that increment access units (e.g., database transaction 21) are generally more significant than transactions that decrement access units (e.g., database transactions 2-20 and 22-122), and transactions that decrement large amounts of access units (e.g., database transaction 21) are more significant than transactions that decrement small amounts of access units (e.g., e.g., database transaction 3). As such, the component may assign a high priority to transactions that increment access units (e.g., database transaction 21), a medium priority to transactions that decrement large amounts of access units (e.g., database transaction 21), and a low priority to transactions that decrement small amounts of access units (e.g., database transaction 3).

In an embodiment, the component may be configured to categorize database transactions into groups and subgroups, and assign priorities to the groups/subgroups. For example, the component may categorize database transactions that decrement access units (e.g., database transactions 2-20 and 22-122) into two groups. The first group may include the database transactions for which deductions are applied immediately (e.g., Immediate Event Charging (IEC), etc.). The second group may include the database transactions for which the deductions are applied after a reserve period (e.g., Event Charging with Unit Reservation (ECUR), Session based Charging with Unit Reservation (SCUR), etc.). The component may assign a higher priority to the database transactions in the first group and a lower priority to the database transactions in the second group.

In an embodiment, the component may be configured to compute a priority value for a database operation/transaction based on transaction type (e.g., the value of the database operation 206 attribute, etc.). In an embodiment, the priority value may be a Boolean or binary value that indicates whether a "notable" flag has been set. In an embodiment, the component may be configured to add a database operation to the redo log only when the notable flag is set. In an embodiment, the component may be configured to determine the transaction type, ignore the notable flag for the "insert" or "delete" transaction types, and set/consider the notable flag for the "update" transaction types.

In an embodiment, the component may be configured to set the notable flag for an update transaction in response to determining that the cost of losing the transaction (e.g., in the event of failure) would be significant for the operator. The component may also set the notable flag for an update transaction based on contextual information. For example, the component may be configured to set the notable flag for an update transaction that decrements 10 access units (e.g., database transaction 3, etc.) in response to the determining that a balance threshold has been reached, that a certain number of transactions have been ignored, or that the aggregate value of the ignored transactions is greater than a threshold value (e.g., when the cumulative summation of the ignored transactions exceeds 100 access units, etc.).

Figure 3:
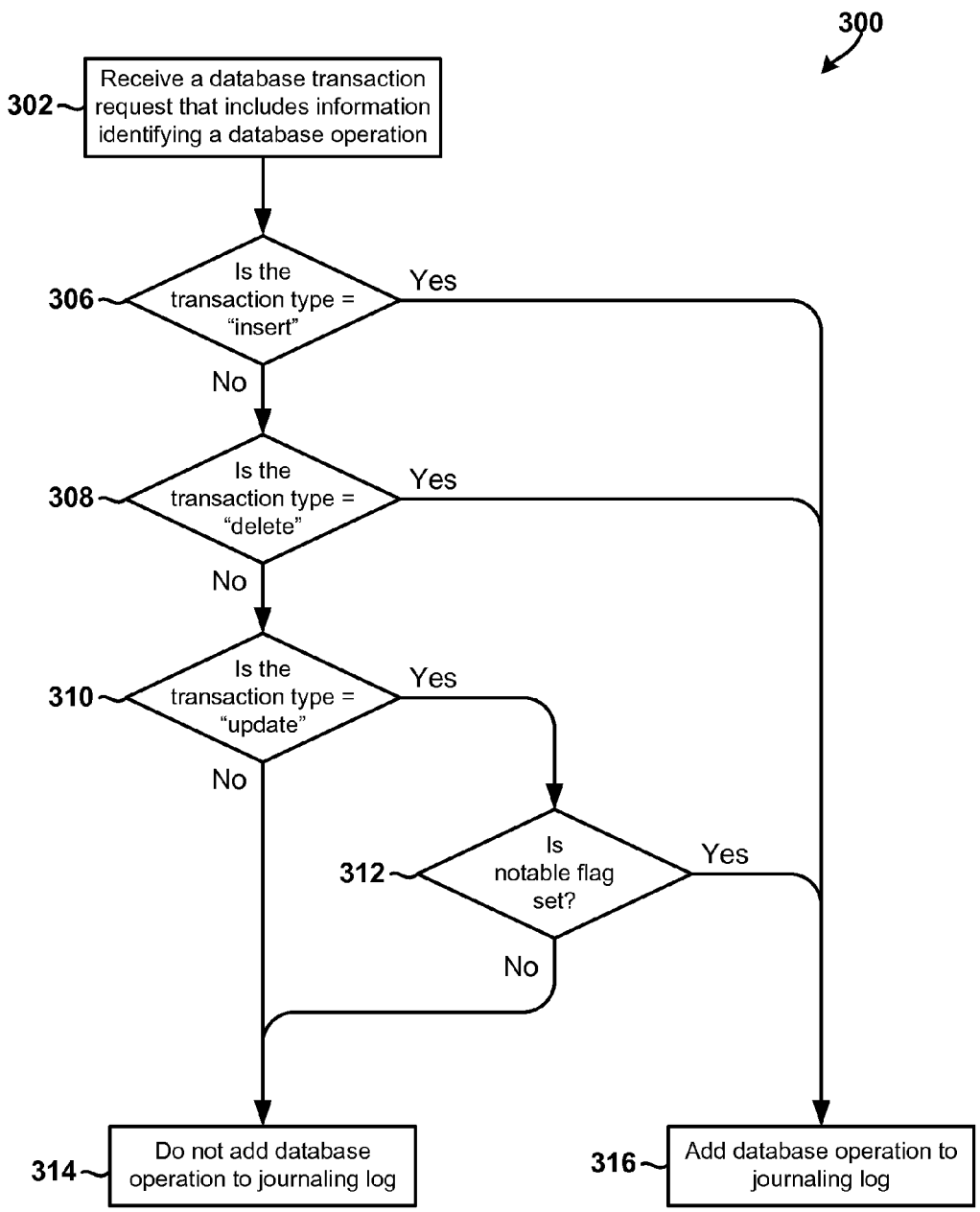
FIG. 3 is a process flow diagram illustrating a method for adding database transactions to a journaling log in accordance with an embodiment.

FIG. 3 illustrates an embodiment method 300 for adding database transactions to a journaling log in accordance with an embodiment. Method 300 may be performed by a processor in a server computing device that includes or is associated with a database system. In block 302, the processor may receive a database transaction request message that includes or identifies a database operation. In determination block 306, the processor may determine whether the transaction type is an insert operation. In response to determining that the transaction type is not an insert operation (i.e., determination block 306="No"), in determination block 308, the processor may determine whether the transaction type is a delete operation. In response to determining that the transaction type is not a delete operation (i.e., determination block 308="No"), the processor may determine whether the transaction type is an update operation in determination block 310. In response to determining that the transaction type is not an update operation (i.e., determination block 310="No"), the processor may ignore the database transaction by excluding the database operation from the journaling log in block 314.

In response to determining that the transaction type is an insert operation (i.e., determination block 306="Yes") or that the transaction type is a delete operation (i.e., determination block 308="Yes"), the processor may add the database operation (or database transaction) to the journaling log in block 316. In response to determining that the transaction type is an update operation (i.e., determination block 310="Yes"), in determination block 312, the processor may determine whether a notable flag has been set in the database transaction request message. If the notable flag has been set (i.e., determination block 312="Yes"), in block 316, the processor may add the database operation (or database transaction) to the journaling log. If the notable flag has not been set (i.e., determination block 312="No"), in block 314, the processor may ignore the database transaction by excluding the database operation from the journaling log.

Alternatively, the component may be configured to assign insert and delete operations the highest priorities, and update operations varying priorities based upon the associated business consequences of losing the update operation. The component may be further configured to add only the operations that have a priority greater than a threshold value to the journaling log. An advantage of this alternative is that the database can dynamically vary the operations that are added to the journaling log by raising and lowering the threshold while the database system is operating. This variance may occur based upon how busy the database system is at the time of processing the transactions/operations.

Figure 4:
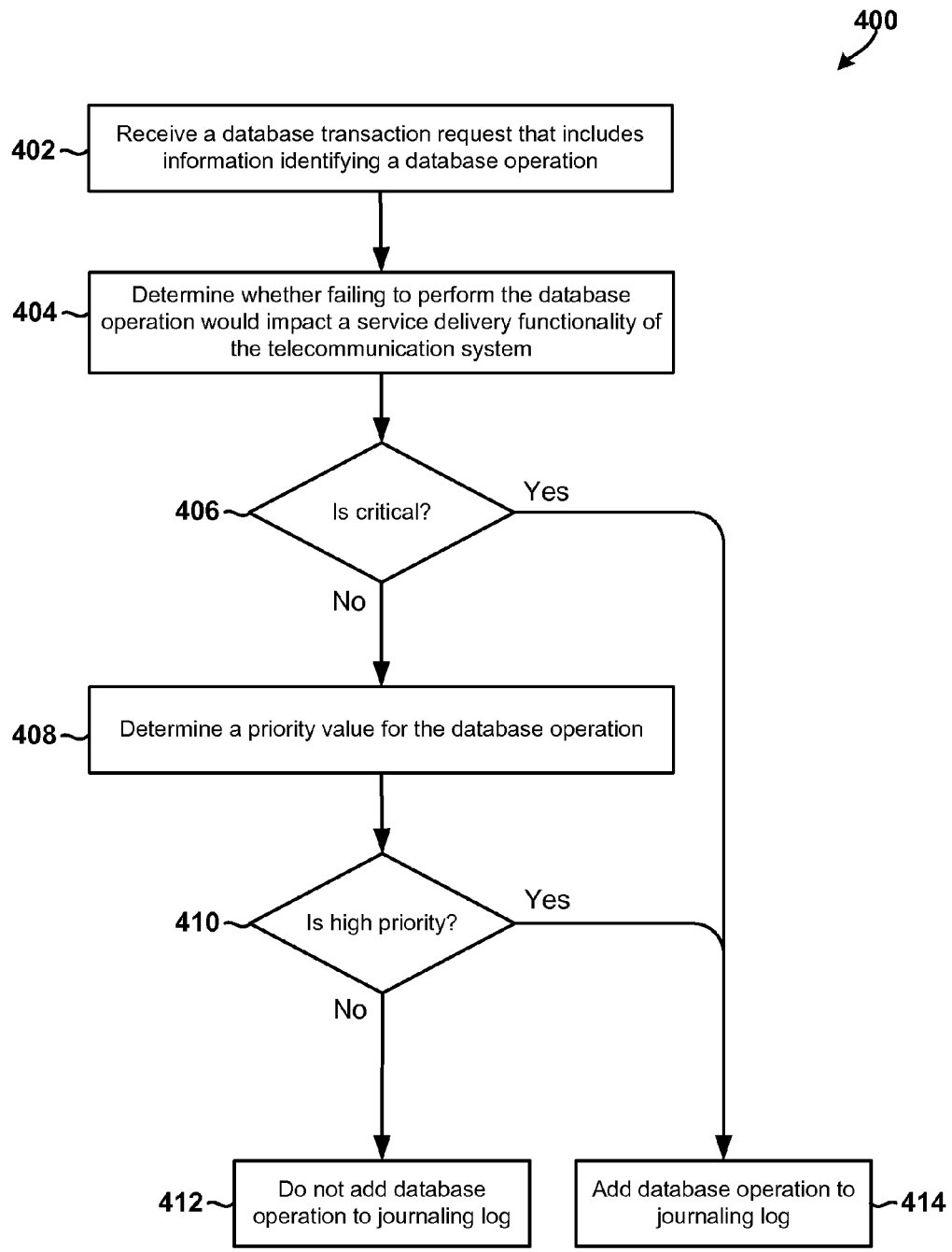
FIG. 4 is a process flow diagram illustrating a method for adding database transactions to a journaling log in accordance with another embodiment.

FIG. 4 illustrates another embodiment method 400 for adding database transactions to a journaling log in accordance with an embodiment. Method 400 may be performed by a processor in a server computing device. In block 402, the processor may receive a database transaction request that includes information identifying a database operation. In block 404, the processor may determine whether failing to perform the database operation would impact a service delivery functionality of the telecommunication system (e.g., cause a session to fail, etc.). In determination block 406, the processor may determine whether the database operation is a critical operation based on the results of block 404 or whether the failure to perform the database operation would interrupt service delivery, cause the telecommunication system to malfunction, or otherwise have a negative impact on the proper functioning of the telecommunication system.

In response to determining that the database operation is a critical operation (i.e., determination block 406="Yes"), in block 414, the processor may add the database operation to the journaling log. In response to determining that the database operation is not a critical operation (i.e., determination block 406="No"), in block 408, the processor may determine a priority value for the database operation. For example, the processor may assign a high priority value to the database operation in response to determining that the operation is an "update" transaction that adds access units to the customer's account balance. The processor may assign a low priority value to the database operation in response to determining that the operation is an "update" transaction that deducts a small amount of access units from a customer's account balance.

In determination block 410, the processor may determine whether the database operation is a high priority operation. In response to determining that the database operation is a high priority operation (i.e., determination block 410="Yes"), in block 414, the processor may add the database operation to the journaling log. In response to determining that the database operation is not a high priority operation (i.e., determination block 410="No"), in block 412, the processor may ignore the database transaction by excluding the database operation from the journaling log.

Figure 5:
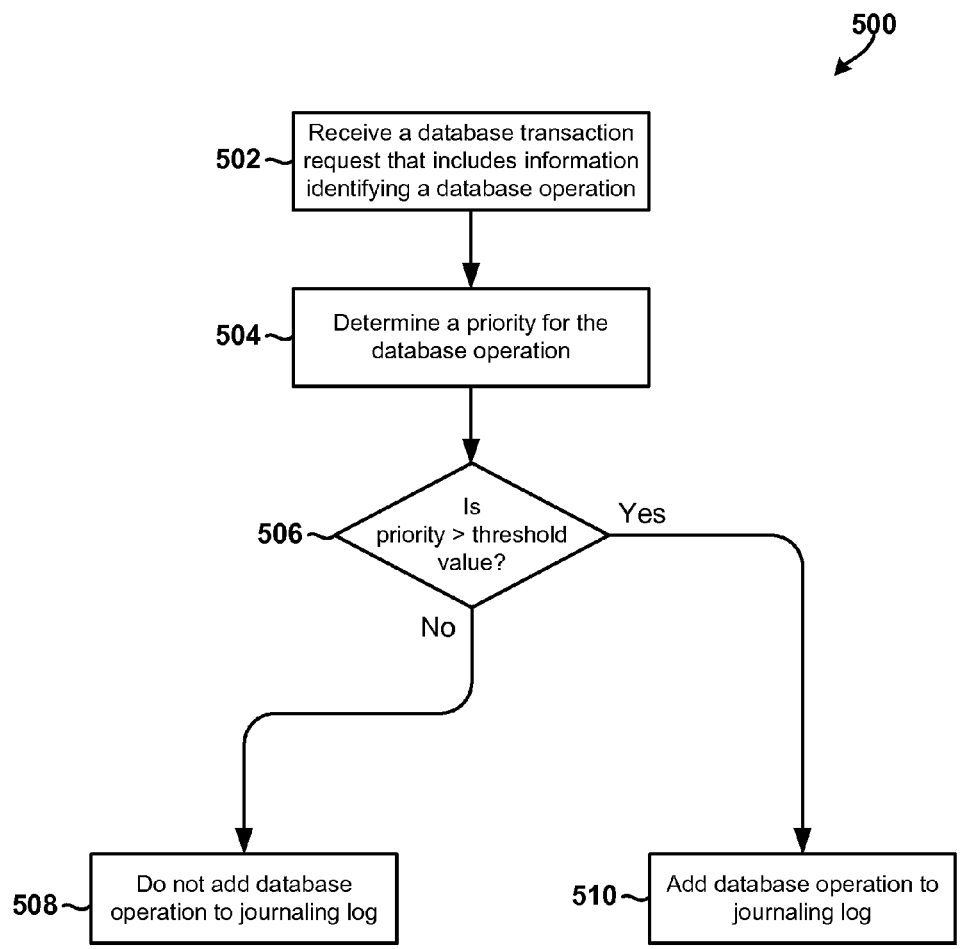
FIG. 5 is a process flow diagram illustrating a method for using a threshold value to determine whether to add a database operation to a journaling log in accordance with an embodiment.

FIG. 5 illustrates a method 500 for using a threshold value to determine whether to add a database operation to a journaling log in accordance with an embodiment. Method 500 may be performed by a processor in a server computing device. In block 502, the processor may receive a database transaction request message that includes or identifies a database operation. In block 504, the processor may determine a priority for the database operation. In determination block 506, the processor may determine whether a priority value associated with the database operation is greater than a threshold value. In response to determining that the priority value is not greater than the threshold value (i.e., determination block 506="No"), in block 508, the processor may ignore the database transaction by excluding the database operation form the journaling log. In response to determining that the priority value is greater than a threshold value (i.e., determination block 506="Yes"), in block 510, the processor may add the database operation to the journaling log.

Figure 6:
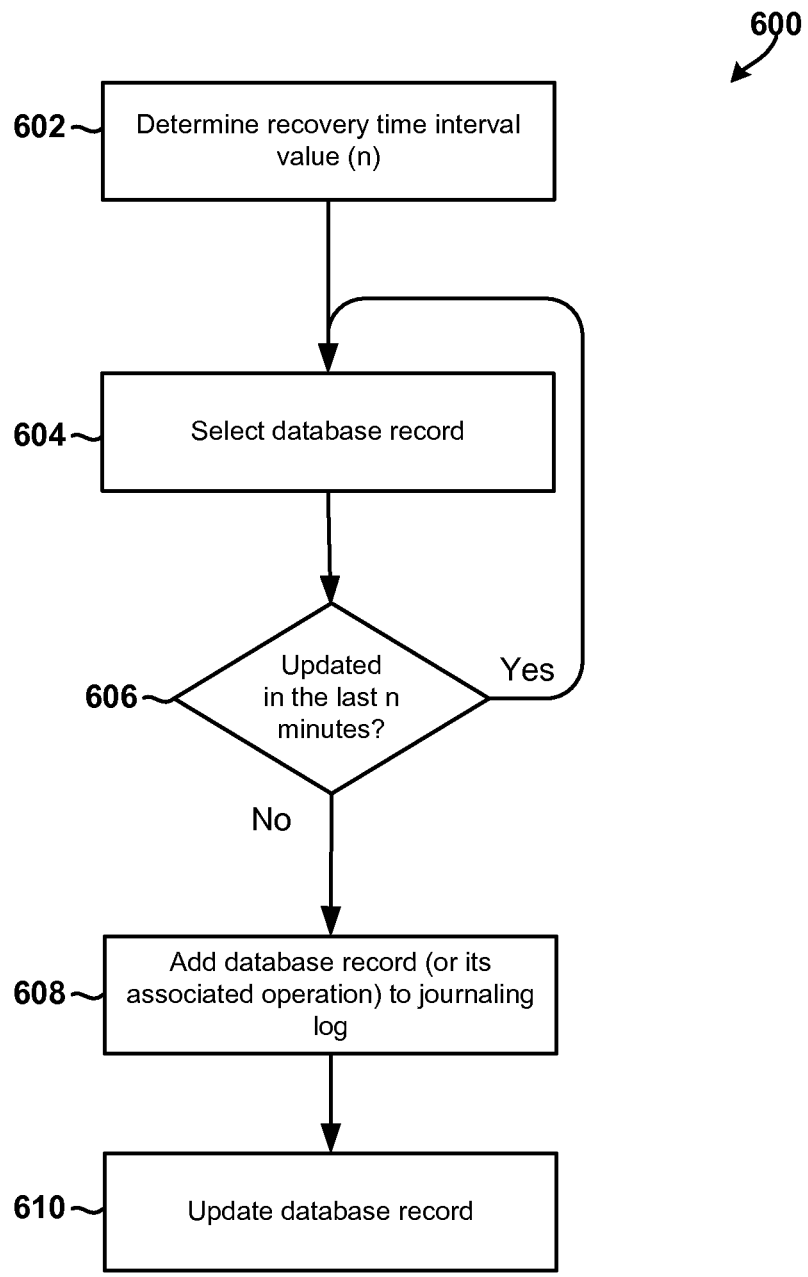
FIG. 6 is a process flow diagram illustrating a method for generating a journaling log suitable for use in recovering a database in accordance with the various embodiments.

FIG. 6 illustrates a method 600 of using a journaling log to recover a database in accordance with an embodiment. Method 600 may be performed by a processor in a server computing device. In block 602, the processor may compute/determine a recovery time interval (n) for applying journal log changes to an empty database. For example, the processor may compute the recovery time interval so that 90% of sessions start and finish within the recovery time interval. As further examples, the processor may calculate the value of the recovery time interval to be equal to the mean session completion time plus one standard deviation (ensuring that 68% of sessions complete), the mean session completion time plus two standard deviations (ensuring that 95% of sessions complete), or the mean session completion time plus three standard deviations (ensuring that approximately 98% of sessions complete), such as in response to determining that the session completion times form a normal distribution. As an example, the processor may compute the recovery time interval value (n) to be 1 hour.

In block 604, the processor may select a database record from a list of all the database records (e.g., database transactions/operations) stored in main-memory. In determination block 606, the processor may determine whether the selected database record has been updated within the most recent recovery time interval (n). For example, the processor may determine whether the current time minus the recovery time interval (n) is greater than the value of the last update time attribute of the database record. In response to determining that the selected database record has been updated within the most recent recovery time interval (i.e., determination block 606="Yes"), the processor may select the next database record from the list in block 604.

In response to determining that the selected database record has not been updated within the most recent recovery time interval (i.e., determination block 606="No"), in block 608, the processor may add/flush the selected database record (or its associated database operation) to the journaling log. In block 610, the processor may update the value of the last update time attribute of the database record.

In various embodiments, the operations of blocks 604 and 606 may be performed by a separate process and/or in the background. In an embodiment, the process may examine all database records each time it operates/is run. In an embodiment, the processor may select and/or examine a subset of the database records each time it operates. Said another way, the process does not need to examine all records each time that it is run. For example, if the process is to examine all records between 8:00 and 9:00, then it could examine the first 25% of the records at an idle period at 8:15, the next 40% of the records at an idle period at 8:35, and the final 35% of the records at an idle period at 8:50.

In an embodiment, the processor may be configured to run the process (i.e., the process for determining whether the selected database record has been updated and flushing records that have not been updated within the most recent recovery time interval) at regular time intervals. In an embodiment, the processor may be configured to determine and set the regular time intervals so that they are less than the recovery time interval. In an embodiment, the processor may be configured to use system monitoring techniques to determine the times when the system is busy or under a heavy load, and dynamically determine or select the regular time intervals so that the process does not run, execute, or operate at times when the system is normally busy or under a heavy load.

In an embodiment, the processor may be configured to run the process at irregular time intervals. In an embodiment, the processor may be configured to determine, select and/or set the irregular time intervals so that the process runs, executes, or operates at least once during the recovery time interval. The processor may be configured to dynamically determine or select the irregular time intervals so as to ensure that the process does not run/execute/operate at times when the system is normally busy or under heavy load (which may be determined based on heuristics or prediction techniques).

In an embodiment, the processor may be configured to run the process based on the availability of system resources. In an embodiment, the processor may be configured to determine the time intervals for running/executing the process based on the availability of system resources. The process may be run more frequently if there are sufficient system resources available, and this may reduce the need to run the process during a subsequent busy period when fewer resources are available. For example, an inactive record may be flushed at 8:40 even if it is not due to be flushed until 9:00, and thus it will not need to be processed again until 9:40 (assuming a one hour recovery time interval). This may be particularly advantageous if the system normally experiences congestion or a high utilization level from 8:45-9:15.

Figure 7:
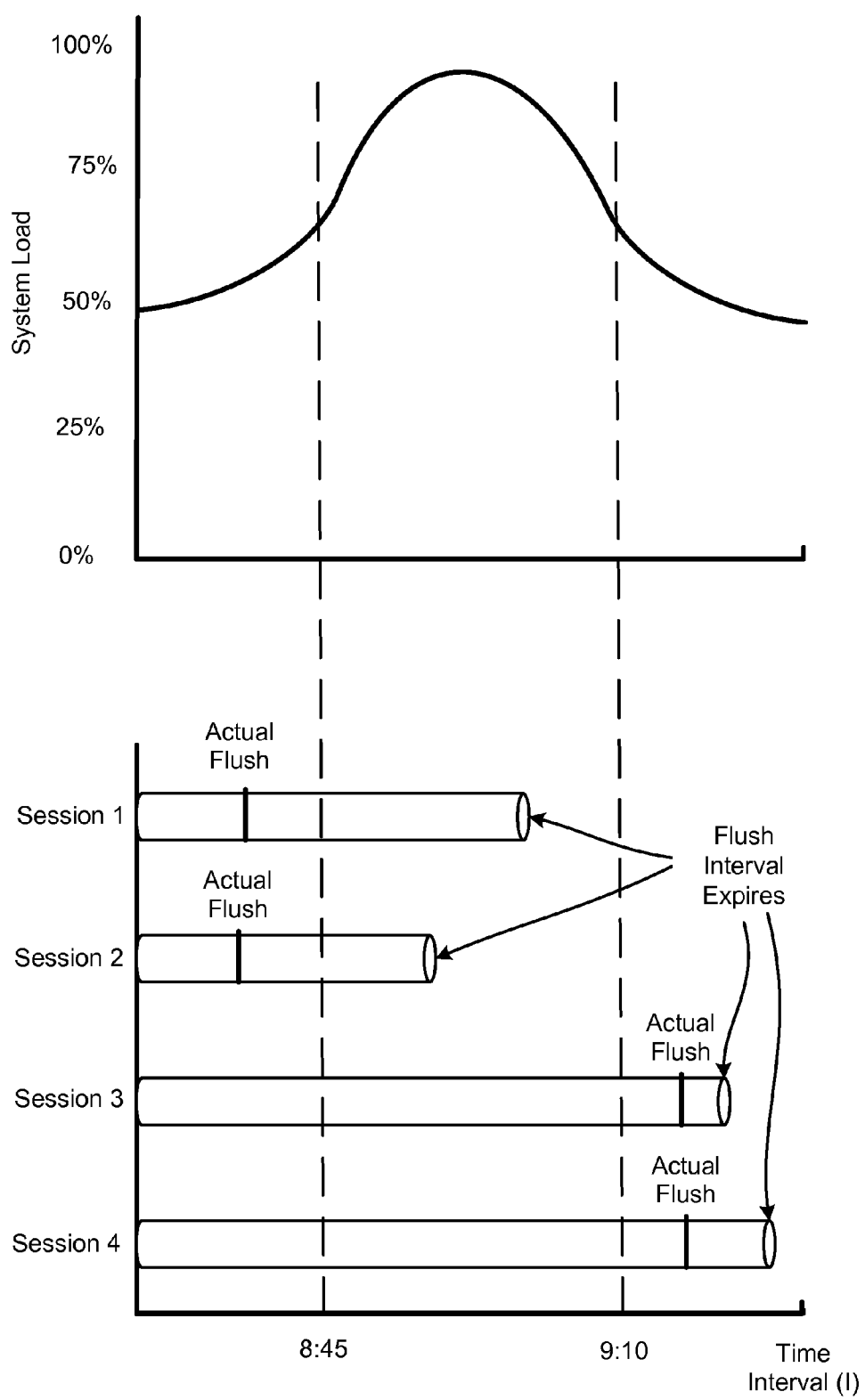
FIG. 7 is chart diagram illustrating that the flush times may be selected based on system load.

FIG. 7 illustrates that the database records may be flushed to the journaling log during inactive system periods or based on the system load. For example, a processor in a server computing device may determine that there is a high probably that the system will experience congestion (or high utilization levels) between 8:45-9:15 AM. The processor may also determine that there is a high probability that a first session (Session 1) and a second session (Session 2) will not be updated before the congestion starts (i.e., before 8:45 AM) and that the system could be required to flush these records to the journaling log during the high congestion period (i.e., between 8:45-9:15). In response, the processor may flush the first and second sessions (or their associated database records) to the journaling log prior to when the congestion starts. Alternatively or in addition, the processor may set the time intervals for running/executing the process that identifies and flushes these records, or set the frequency in which the process is executed or run, so as to avoid performing the identification/flush operations (e.g., the operations of blocks 604 and 606 illustrated in FIG. 6, etc.) during periods of high congestion.

Figure 8:
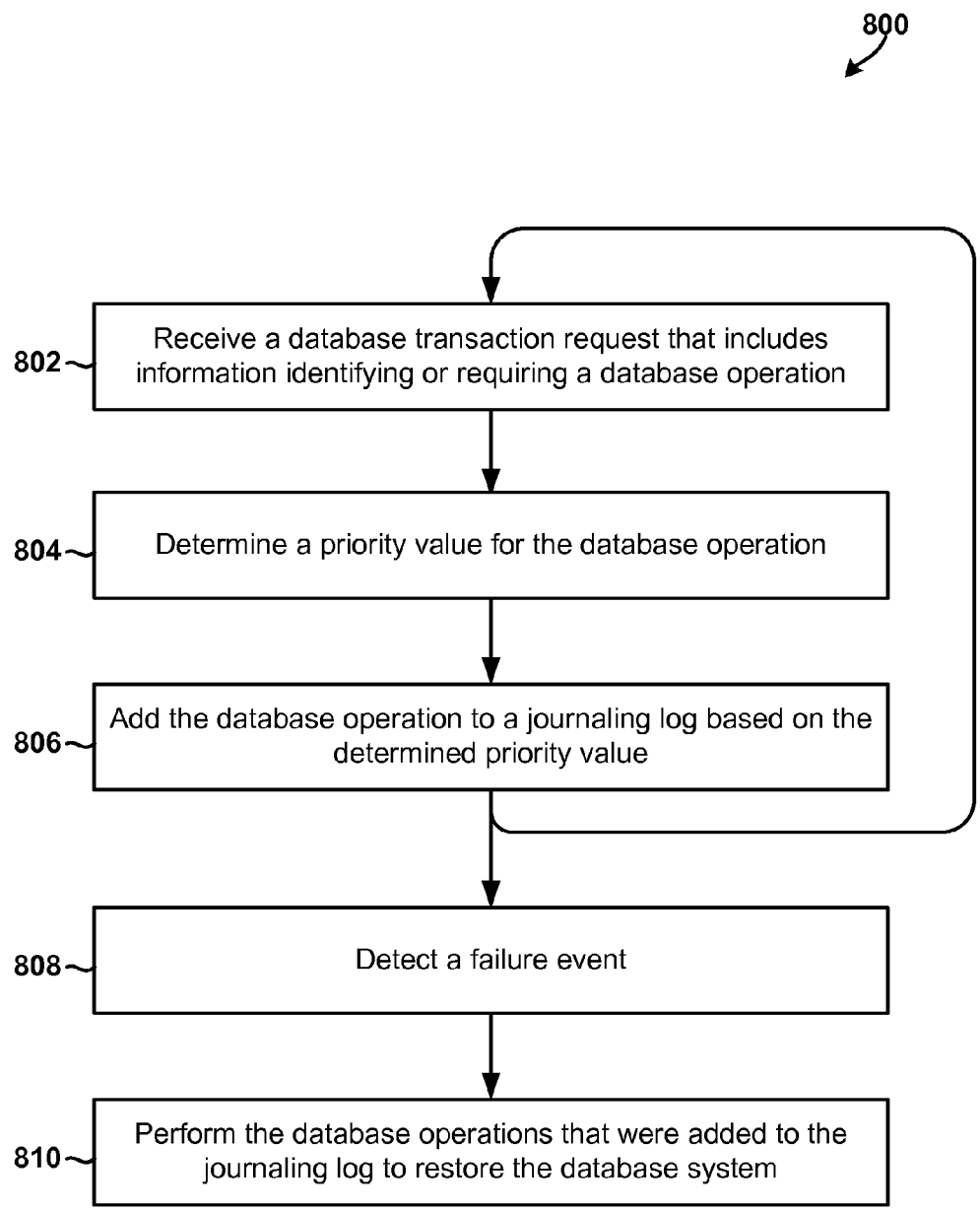
FIG. 8 is a process flow diagram illustrating a method for restoring a database in accordance with an embodiment.

FIG. 8 illustrates a method 800 of restoring a database system in accordance with an embodiment. Method 800 may be performed by a processor in a server computing device. In block 802, the processor may receive a database transaction request that includes information identifying a database operation. In block 804, the processor may determine a priority value for the database operation, such as by determining whether a notable flag associated with the database transaction request has been set (indicating a high priority), determining the transaction type of the database operation, determining whether the database operation is an update operation that adds service access units to a balance account in a charging system, etc. In block 806, the processor may add the database operation to a journaling log based on the determined priority value. For example, the processor may add the database operation to the journaling log if the notable flag has been set and/or not add the database operation to the journaling log if the notable flag has not been set. The processor may repeat the operations of blocks 802-806, as needed, until a failure event is detected in block 808. In block 810, the processor may restore the database system by performing database operations that are identified in the journaling log. That is, in block 810, the processor may perform the database operations that were added to the journaling log in block 806.

Figure 9:
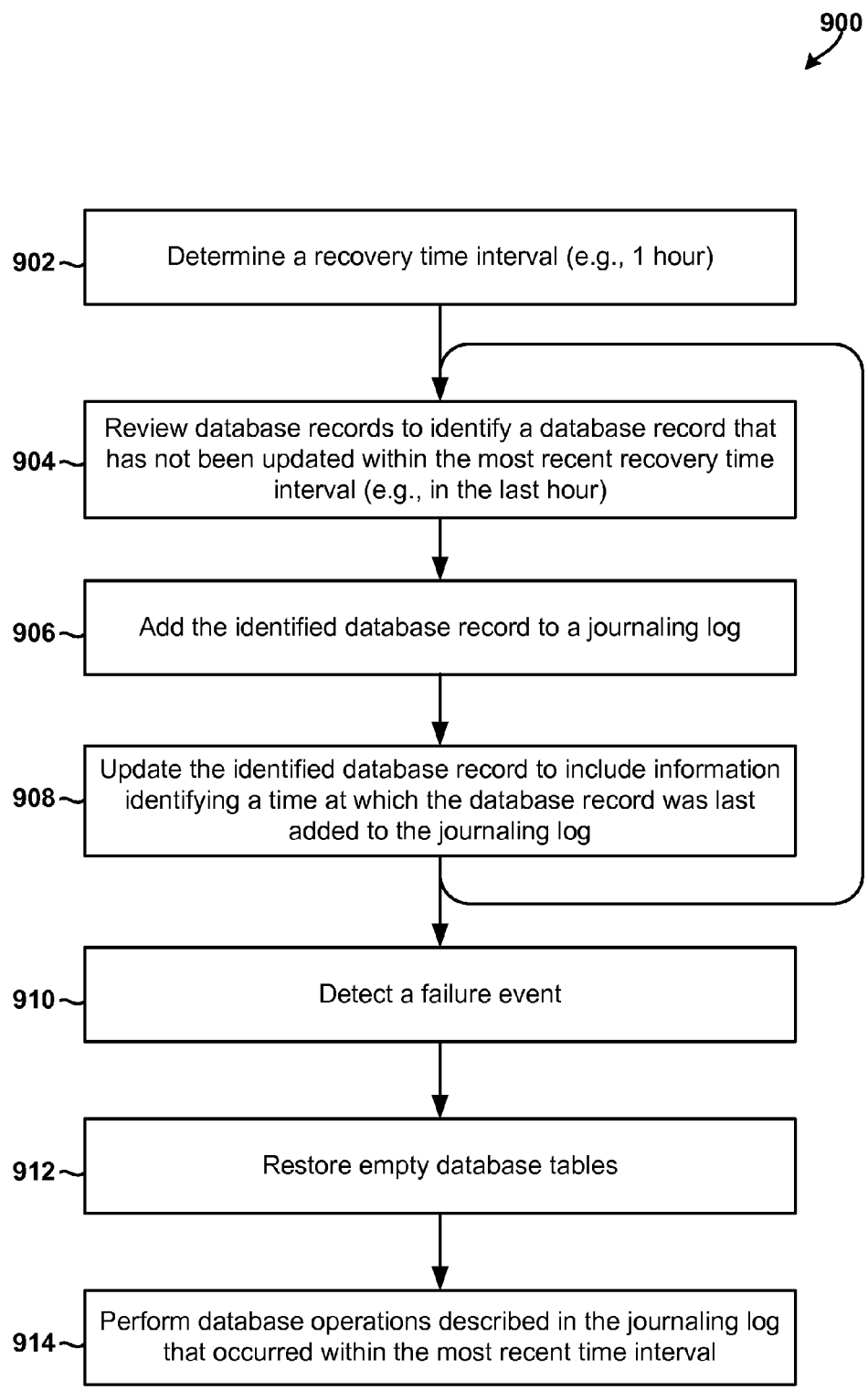
FIG. 9 is a process flow diagram illustrating a method for restoring a database in accordance with another embodiment.

FIG. 9 illustrates a method 900 of restoring a database system in accordance with another embodiment. Method 900 may be performed by a processor in a server computing device. In block 902, the processor may determine a recovery time interval (e.g., 1 hour, etc.). For example, the processor may determine a time interval in which about 90% of sessions start and finish, and set the value of a recovery time interval parameter to the determined time interval. In block 904, the processor may review database records (e.g., database records that are stored in volatile main-memory) to identify database records that have not been updated within the most recent recovery time interval (e.g., in the last hour, etc.). In block 906, the processor may add the identified database records to a journaling log. In block 908, the processor may update the identified database record to include information identifying a time at which the database record was last added to the journaling log. In an embodiment, the operations of blocks 904-908 may be performed via a separate process or thread.

In block 910, the processor may detect a failure event, such as an unexpected shutdown, system failure, etc. In blocks 912 and 914, the processor may use the journaling log to restore the database system (i.e., in response to the failure event). For example, in block 912, the processor may restore empty database tables. In block 914, the processor may perform the database operations described in the journaling log that occurred within the most recent time interval. That is, in block 914, the processor may perform the database operations that were added to the journaling log in block 906.

Conventional database solutions do not allow the user to restore the system without using some form of disk backup as a basis followed by application of all the redo/journaling information generated since the disk backup. As a result, these solutions require large quantities of expensive computer hardware to implement backups in such a manner that they are not disruptive and recovery is not unreasonably slow. By using the mechanisms described above (e.g., embodiment methods illustrated in FIGS. 3-9, etc.), the need for backups may be eliminated and the amount of the redo that needs to be replayed may be reduced. For example, a server computing device may be able to restore a database system by replaying between 1 and 4 hours operations, rather than the up to 23 hours that would be required using conventional solutions that perform daily backups.

Figure 10:
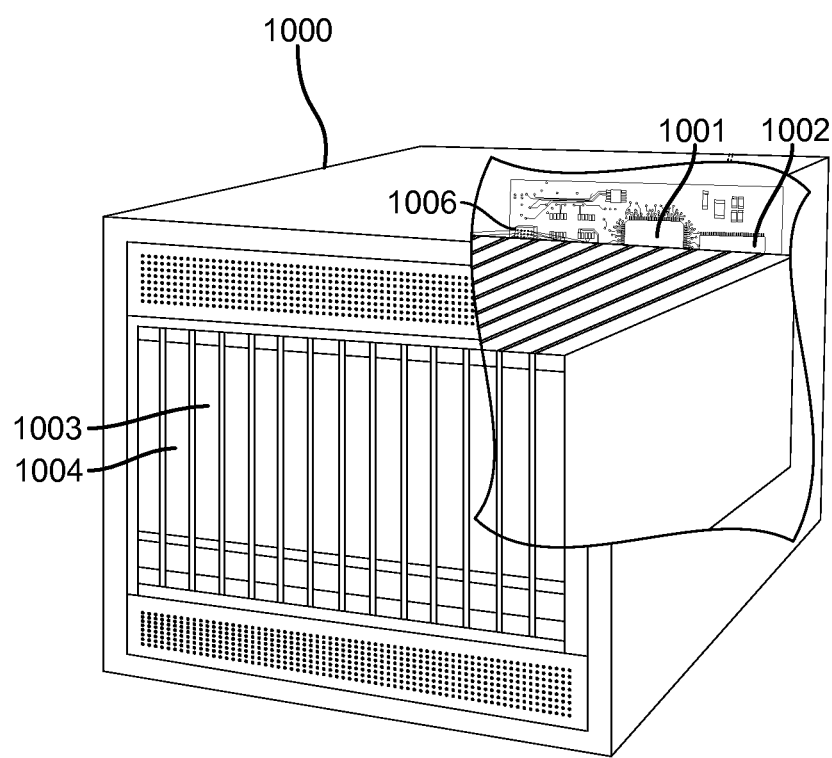
FIG. 10 is a component diagram of server suitable for implementing various embodiments.

The various embodiments may be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1006 coupled to the processor 1001. The server 1000 may also include network access ports 1004 coupled to the processor 1001 for establishing data connections with a network 1005, such as a local area network coupled to other operator network computers and servers.

The processor 1001 may be any programmable microprocessor, microcomputer or multiple processor chip or chips that may be configured by software instructions (applications) to perform a variety of functions, including the functions of the various embodiments described below. Multiple processors 1001 may be provided, such as one processor dedicated to wireless communication functions and one processor dedicated to running other applications. Typically, software applications may be stored in the internal memory 1002, 1003 before they are accessed and loaded into the processor 1001. The processor 1001 may include internal memory sufficient to store the application processor-executable software instructions.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof If implemented in software, the functions may be stored as one or more instructions or code on a non-transitory server-readable or processor-readable storage medium. The steps of a method or algorithm disclosed herein may be embodied in a processor-executable software module, which may reside on a non-transitory processor-readable or server-readable storage medium. Non-transitory processor-readable and server-readable media may be any available storage media that may be accessed by a computer or a processor of a computing device. By way of example, and not limitation, such non-transitory processor-readable or server -readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a server or processor of a server. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory server-readable media. Additionally, the operations of a method or algorithm may reside as one or any combination or set of codes and/or instructions on a non-transitory processor-readable medium and/or non-transitory server-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of restoring a database system that is accessible to network components in a high-speed telecommunication system, the method comprising:
   receiving in a processor of a server computing device a database transaction request that includes information identifying a database operation;
   determining a priority value for the database operation identified in the received database transaction request;
   determining whether the priority value is greater than a threshold value;
   adding the database operation to a journaling log in response to determining that the determined priority value is greater than the threshold value;
   detecting a failure event; and
   performing database operations identified in the journaling log to restore the database system in response to detecting the failure event.

2. The method of claim 1, further comprising determining whether the database operation is a critical operation based on whether failing to perform the database operation would impact a service delivery functionality of the telecommunication system.

3. The method of claim 1, wherein determining the priority value for the database operation comprises determining whether a notable flag associated with the database transaction request is set.

4. The method of claim 1, wherein determining the priority value for the database operation comprises:
   determining a transaction type of the database operation; and
   computing the priority value based on the transaction type.

5. The method of claim 4, wherein:
   determining the transaction type of the database operation comprises determining whether the database operation is one of an insert operation, a delete operation, and an update operation; and
   computing the priority value based on the transaction type comprises assigning a high priority to the database operation in response to determining that the database operation is one of the insert operation and the delete operation.

6. The method of claim 5, wherein computing the priority value based on the transaction type comprises:
   determining whether the database operation adds service access units to a balance account in a charging system in response to determining that the database operation is the update operation; and
   assigning a high priority to the database operation in response to determining that the database operation adds access units to the balance account.

7. The method of claim 1, wherein determining whether the priority value is greater than the threshold value comprises determining whether determined priority value is greater than a system load value computed at run time.

8. The method of claim 1, wherein determining the priority value for the database operation comprises:
   assigning a high priority to the database operation in response to determining that a number of other database operations were previously assigned a low priority.

9. The method of claim 1, wherein determining the priority value for the database operation comprises:
   determining the priority value based on an aggregate of values associated with database operations that were previously assigned a low priority.

10. The method of claim 1, wherein determining the priority value for the database operation comprises:
    determining the priority value based on a probability that failure to perform the database operation will result in a user contacting customer services.

11. The method of claim 1, wherein determining the priority value for the database operation comprises:
    determining the priority value based on a roaming status.

12. A server computing device deployed in a high-speed telecommunication system, comprising:
    a processor configured with processor-executable instructions to perform operations comprising:
    receiving a database transaction request that includes information identifying a database operation;
    determining a priority value for the database operation;
    determining whether the priority value is greater than a threshold value;
    adding the database operation to a journaling log in response to determining that the determined priority value is greater than the threshold value;
    detecting a failure event; and
    performing database operations identified in the journaling log to restore the database system in response to detecting the failure event.

13. The server computing device of claim 12, wherein the processor is configured with processor-executable instructions to perform operations further comprising determining whether the database operation is a critical operation based on whether failing to perform the database operation would impact a service delivery functionality of the telecommunication system.

14. The server computing device of claim 12, wherein the processor is configured with processor-executable instructions to perform operations such that determining the priority value for the database operation comprises determining whether a notable flag associated with the database transaction request is set.

15. The server computing device of claim 12, wherein the processor is configured with processor-executable instructions to perform operations such that determining the priority value for the database operation comprises:
   determining a transaction type of the database operation; and
   computing the priority value based on the transaction type.

16. The server computing device of claim 15, wherein the processor is configured with processor-executable instructions to perform operations such that:
   determining the transaction type of the database operation comprises determining whether the database operation is one of an insert operation, a delete operation, and an update operation; and
   computing the priority value based on the transaction type comprises assigning a high priority to the database operation in response to determining that the database operation is one of the insert operation and the delete operation.

17. The server computing device of claim 16, wherein the processor is configured with processor-executable instructions to perform operations such that computing the priority value based on the transaction type comprises:
   determining whether the database operation adds service access units to a balance account in a charging system in response to determining that the database operation is the update operation; and
   assigning a high priority to the database operation in response to determining that the database operation adds access units to the balance account.

18. The server computing device of claim 12, wherein the processor is configured with processor-executable instructions to perform operations such that determining whether the priority value is greater than the threshold value comprises determining whether determined priority value is greater than a system load value computed at run time.

19. The server computing device of claim 12, wherein the processor is configured with processor-executable instructions to perform operations such that determining the priority value for the database operation comprises:
   assigning a high priority to the database operation in response to determining that a number of other database operations were previously assigned a low priority.

20. The server computing device of claim 12, wherein the processor is configured with processor-executable instructions to perform operations such that determining the priority value for the database operation comprises:
   determining the priority value based on an aggregate of values associated with database operations that were previously assigned a low priority.

21. The server computing device of claim 12, wherein the processor is configured with processor-executable instructions to perform operations such that determining the priority value for the database operation comprises:
   determining the priority value based on a probability that failure to perform the database operation will result in a user contacting customer services.

22. The server computing device of claim 12, wherein the processor is configured with processor-executable instructions to perform operations such that determining the priority value for the database operation comprises:
   determining the priority value based on a roaming status.

23. A non-transitory computer readable storage medium having stored thereon processor-executable software instructions configured to cause a processor in a server computing device deployed in a high-speed telecommunication system to perform operations for restoring a database system, the operations comprising:
   receiving a database transaction request that includes information identifying a database operation;
   determining a priority value for the database operation;
   determining whether the priority value is greater than a threshold value;
   adding the database operation to a journaling log in response to determining that the determined priority value is greater than the threshold value;
   detecting a failure event; and
   performing database operations identified in the journaling log to restore the database system in response to detecting the failure event.

24. The non-transitory computer readable storage medium of claim 23, wherein the stored processor-executable software instructions are configured to cause a processor to perform operations further comprising determining whether the database operation is a critical operation based on whether failing to perform the database operation would impact a service delivery functionality of the telecommunication system.

25. The non-transitory computer readable storage medium of claim 23, wherein the stored processor-executable software instructions are configured to cause a processor to perform operations such that determining the priority value for the database operation comprises determining whether a notable flag associated with the database transaction request is set.

26. The non-transitory computer readable storage medium of claim 23, wherein the stored processor-executable software instructions are configured to cause a processor to perform operations such that determining the priority value for the database operation comprises:
   determining a transaction type of the database operation; and
   computing the priority value based on the transaction type.

27. The non-transitory computer readable storage medium of claim 26, wherein the stored processor-executable software instructions are configured to cause a processor to perform operations such that:
   determining the transaction type of the database operation comprises determining whether the database operation is one of an insert operation, a delete operation, and an update operation; and
   computing the priority value based on the transaction type comprises assigning a high priority to the database operation in response to determining that the database operation is one of the insert operation and the delete operation.

28. The non-transitory computer readable storage medium of claim 27, wherein the stored processor-executable software instructions are configured to cause a processor to perform operations such that computing the priority value based on the transaction type comprises:
  determining whether the database operation adds service access units to a balance account in a charging system in response to determining that the database operation is the update operation; and
  assigning a high priority to the database operation in response to determining that the database operation adds access units to the balance account.

29. The non-transitory computer readable storage medium of claim 23, wherein the stored processor-executable software instructions are configured to cause a processor to perform operations such that determining whether the priority value is greater than the threshold value comprises determining whether determined priority is greater than a system load value computed at run time.

30. The non-transitory computer readable storage medium of claim 23, wherein the stored processor-executable software instructions are configured to cause a processor to perform operations such that determining the priority value for the database operation comprises:
  assigning a high priority to the database operation in response to determining that a number of other database operations were previously assigned a low priority.

31. The non-transitory computer readable storage medium of claim 23, wherein the stored processor-executable software instructions are configured to cause a processor to perform operations such that determining the priority value for the database operation comprises:
  determining the priority value based on an aggregate of values associated with database operations that were previously assigned a low priority.

32. The non-transitory computer readable storage medium of claim 23, wherein the stored processor-executable software instructions are configured to cause a processor to perform operations such that determining the priority value for the database operation comprises:
  determining the priority value based on a probability that failure to perform the database operation will result in a user contacting customer services.

33. The non-transitory computer readable storage medium of claim 23, wherein the stored processor-executable software instructions are configured to cause a processor to perform operations such that determining the priority value for the database operation comprises:
  determining the priority value based on a roaming status.

* * * * *